United States Patent
Matsumura et al.

(10) Patent No.: US 7,924,355 B2
(45) Date of Patent: Apr. 12, 2011

(54) LIQUID CRYSTAL DISPLAY DEVICE

(75) Inventors: Mieko Matsumura, Kokubunji (JP);
 Toshio Miyazawa, Chiba (JP); Takeshi Sato, Kokubunji (JP); Yoshiaki Toyota, Hachioji (JP)

(73) Assignee: Hitachi Displays, Ltd., Chiba (JP)

( * ) Notice: Subject to any disclaimer, the term of this patent is extended or adjusted under 35 U.S.C. 154(b) by 178 days.

(21) Appl. No.: 12/153,508

(22) Filed: May 20, 2008

(65) Prior Publication Data

US 2008/0316385 A1 Dec. 25, 2008

(30) Foreign Application Priority Data

Jun. 21, 2007 (JP) ................. 2007-164240

(51) Int. Cl.
 *G02F 1/1343* (2006.01)
 *G02F 1/1335* (2006.01)
 *G02F 1/13* (2006.01)
 *H01L 33/08* (2010.01)
(52) U.S. Cl. .............. 349/39; 349/139; 257/72
(58) Field of Classification Search .............. 349/39–49, 349/139–141; 257/59, 72
 See application file for complete search history.

(56) References Cited

U.S. PATENT DOCUMENTS

| | | | | |
|---|---|---|---|---|
| 5,952,675 | A * | 9/1999 | Katoh | 257/59 |
| 6,259,200 | B1 * | 7/2001 | Morita et al. | 313/498 |
| 6,613,614 | B2 * | 9/2003 | Yamazaki et al. | 438/151 |
| 6,862,067 | B2 | 3/2005 | Matsumoto et al. | |
| 7,142,273 | B1 * | 11/2006 | Zhang et al. | 349/139 |
| 7,599,032 | B2 * | 10/2009 | Chang et al. | 349/141 |
| 2001/0007779 | A1 * | 7/2001 | Lee et al. | 438/30 |
| 2002/0180920 | A1 * | 12/2002 | Noh et al. | 349/141 |
| 2005/0270446 | A1 * | 12/2005 | Kim et al. | 349/110 |
| 2006/0187397 | A1 * | 8/2006 | Nakamura et al. | 349/139 |
| 2009/0009672 | A1 * | 1/2009 | Chung et al. | 349/38 |

FOREIGN PATENT DOCUMENTS

| | | |
|---|---|---|
| CN | 1434338 A | 1/2003 |
| CN | 2735379 Y | 9/2004 |
| JP | 2003-207795 | 1/2002 |
| JP | 2005-338256 | 5/2004 |
| JP | 2006-126602 | 10/2004 |

OTHER PUBLICATIONS

Office Action from China Patent Office issued on Nov. 6, 2009, with partial English translation.

* cited by examiner

*Primary Examiner* — Akm Ullah
(74) *Attorney, Agent, or Firm* — Stites & Harbison PLLC; Juan Carlos A. Marquez, Esq.

(57) ABSTRACT

Three layers are formed on a TFT substrate SUB 100. The three layers include a first transparent electrode PSL1 131, a second transparent electrode CSL 127 and a third transparent electrode PSL2 132, all of which are laminated in parallel to the substrate surface. Two auxiliary capacitances to a liquid crystal capacitance are formed between the first transparent electrode PSL1 131 and the second transparent electrode CSL 127 and between the second transparent electrode CSL 127 and the third transparent electrode PSL2 132.

5 Claims, 15 Drawing Sheets

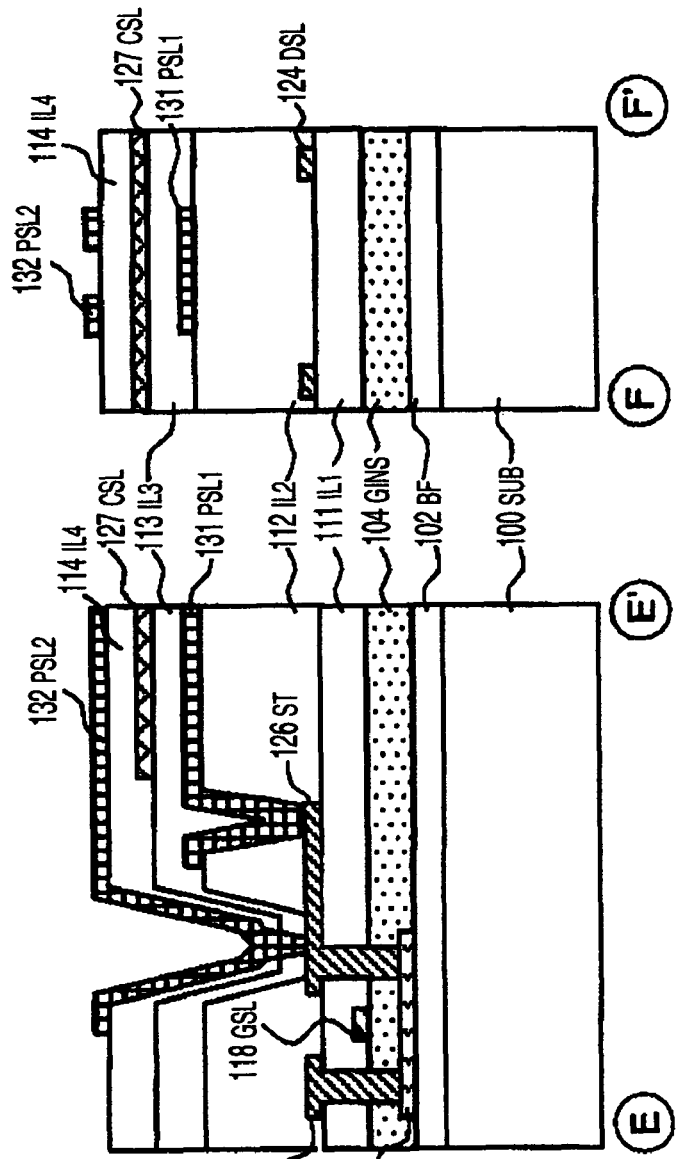

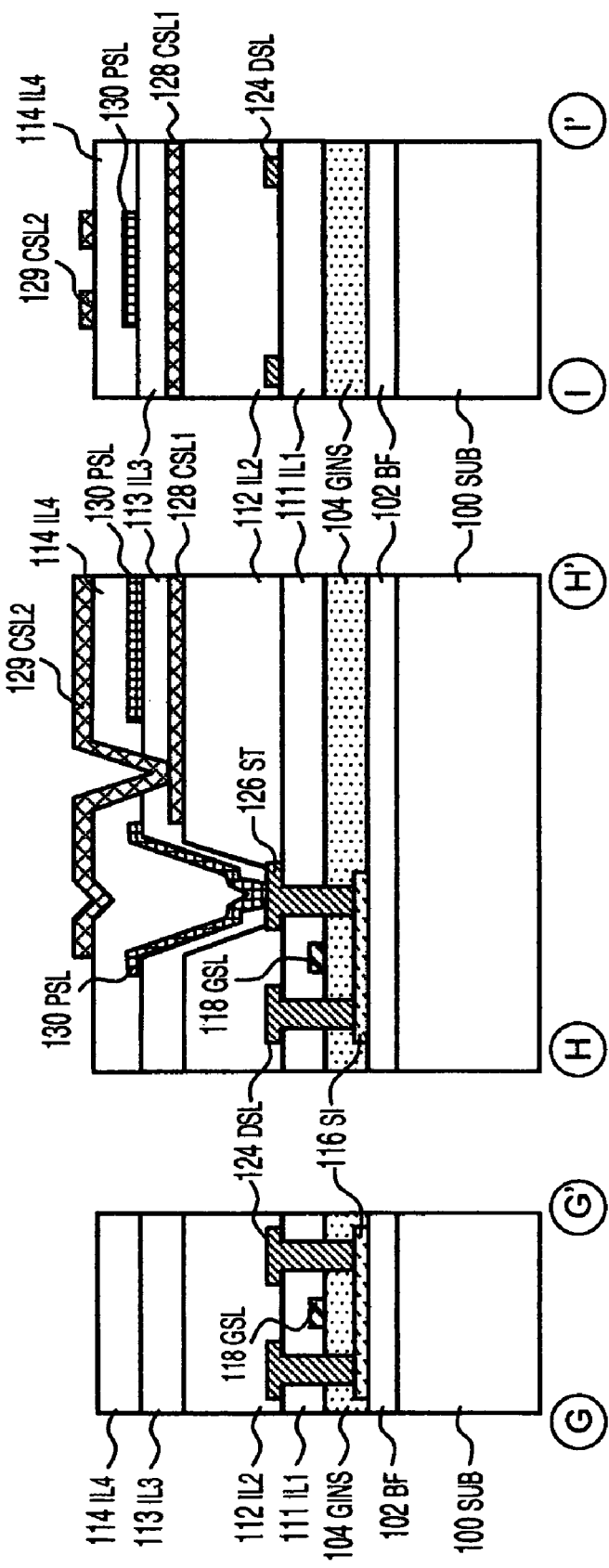

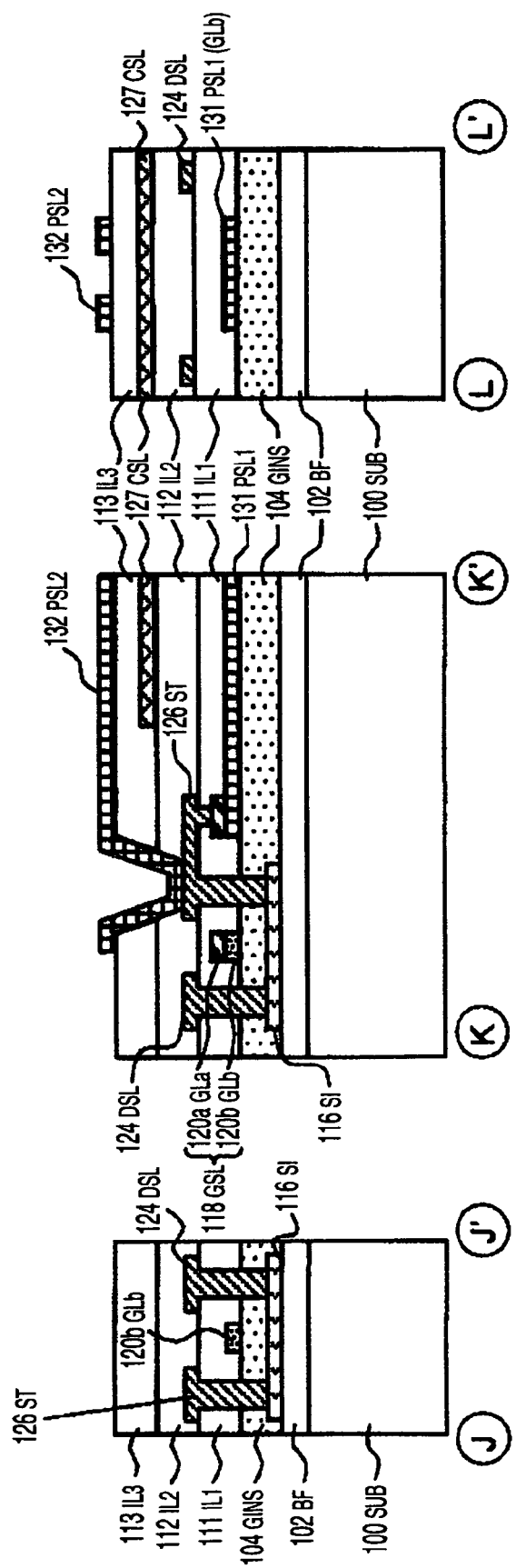

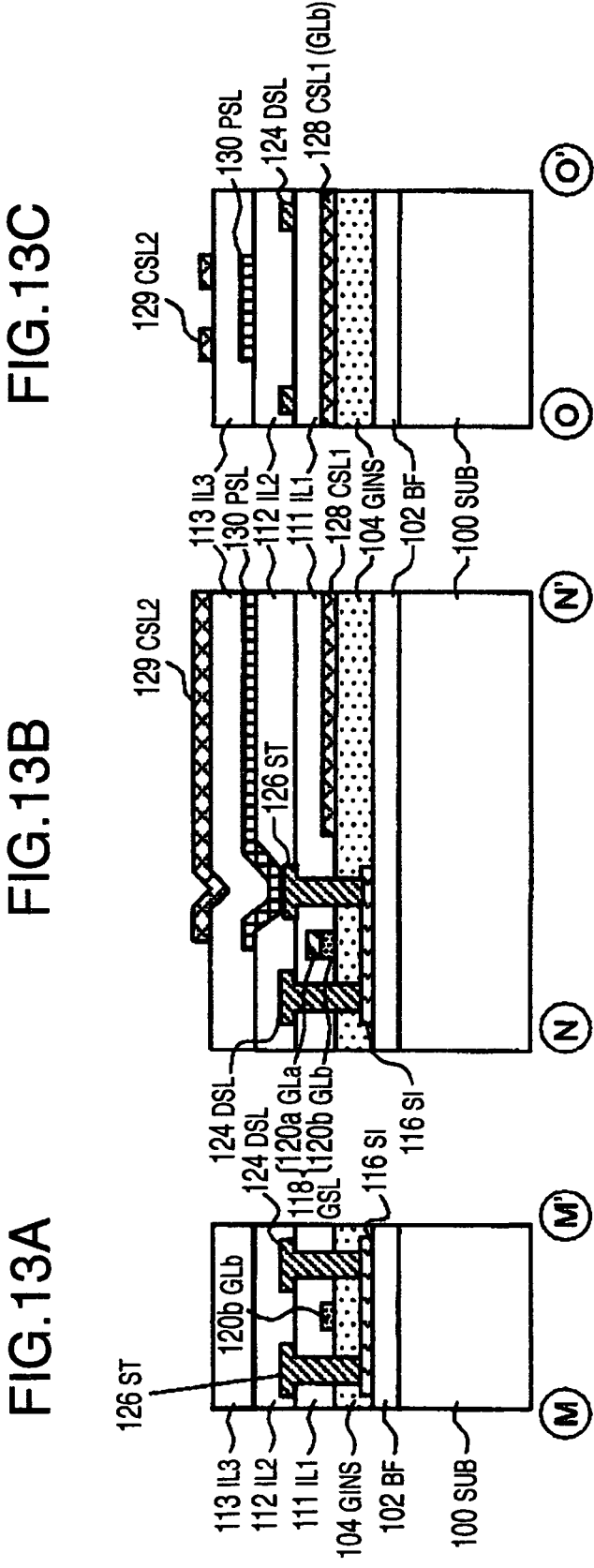

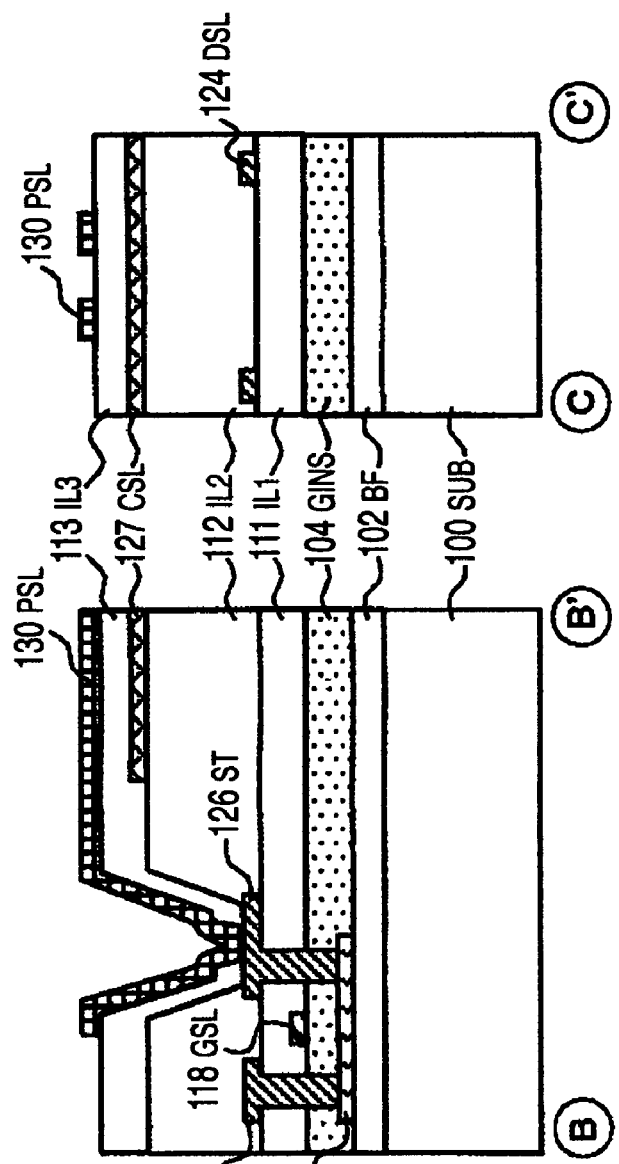

LIQUID CRYSTAL DISPLAY DEVICE

CLAIM OF PRIORITY

The present application claims priority from Japanese application JP2007-164240 filed on Jun. 21, 2007, the content of which is hereby incorporated by reference into this application.

BACKGROUND OF THE INVENTION

The present invention relates to a liquid crystal display device, and more particularly to the liquid crystal display device which is arranged to improve shortage of an auxiliary capacitance caused by keeping the display high-definitive.

A request is rising for making small-sized liquid crystal display devices to be used for mobile phones or digital cameras more and more high-definitive. Among the liquid crystal display devices, so-called IPS (In-Plane Switching) type liquid crystal display device arranged to apply a horizontal electric field is advantageous in wide viewing angle. Among the IPS type liquid crystal displays, the liquid crystal display devices arranged to have a pixel structure composed of comb-like pixel electrodes and planar common electrodes is advantageous in that the overlapped portion between the transparent pixel electrode and the transparent common electrode is used as a capacitance auxiliary to the liquid crystal capacitance. However, as the display is made more and more high-definitive, disadvantageously, the ratio of the area of the pixel electrodes is made smaller, and accordingly the auxiliary capacitance becomes short.

As mentioned above, the IPS type liquid crystal display device (referred to as the IPS type LCD device) is arranged so that the comb-like pixel electrodes are located as opposed to the planar common electrodes with an insulating film laid therebetween. One of the advantages of the IPS type LCD device is generation of a transparent auxiliary capacitance between the pixel electrode and the common line. The method of realizing a brighter display as keeping the high viewing angle specific to the IPS type has been proposed in JP-A-2003-207795, JP-A-2005-338256 and JP-A-2006-126602.

SUMMARY OF THE INVENTION

As the small-sized display is made more and more high-definitive, the area ratio of the comb-like pixel electrodes becomes smaller, and accordingly the auxiliary capacitance becomes short. FIG. 16 shows an overall concept of a thin-film transistor array substrate (referred to as a TFT substrate). In FIG. 16, a driver portion GDR 150 for driving gate signal lines GSL 118, common signal lines CSL 127, and so forth is composed of an n-channel thin-film transistor TFTn and a p-channel thin-film transistor TFTp. A drain driver portion DDR 160 for basically driving a drain signal line DSL 124 is also composed of the TFTn 141 and the TFTp 142. The gate signal lines GSL 118 and the drain signal lines DSL 124 are intersected so that the adjacent each two signal lines may compose a pixel PXL 170.

The common signal line CSL 127 is located in parallel to the gate signal line GSL 118. Each pixel PXL 170 includes a thin-film transistor TFT 140, a liquid crystal capacitance LC 144 and an auxiliary capacitance Cst 146. The electric potential of the drain line DSL 124 corresponding to a video signal is transferred to the pixel electrode through the thin-film transistor TFT 140 to be switched on and off in response to a gate signal. The electric potential is held in the parallel connection of the liquid crystal capacitance LC 144 and the auxiliary capacitance Cst 146 located between the pixel electrode and the common signal electrode. Since leaked current flows through the liquid crystal and the thin-film transistor, the auxiliary capacitance Cst 146 takes an important role in keeping the electric potential.

The composition of the TFT substrate will be described along the manufacturing process with reference to FIGS. 17A to 19. FIGS. 17A and 17B are schematic plane views for describing the structure of the p-channel thin-film transistor and the pixel portion. FIGS. 18A, 18B and 18C are schematic cross section views taken on the lines A-A', B-B' and C-C' of FIGS. 17A and 17B. FIG. 19 is a conceptual view showing a circuit arrangement of a liquid crystal pixel. Hereafter, the flow of manufacturing the TFT substrate will be described in sequence. In FIGS. 17A and 17B, the p-channel thin-film transistor is composed of a gate electrode GSL 118, a drain signal line DSL 124 and a source electrode ST 126 on a polysilicon island SI 116.

At first, the polysilicon islands SI 116 are formed on a supporting substrate SUB 100 on which a base film BF 102, preferably silicon oxide ($SiO_2$) and silicon nitride (SiN), is formed (photo process 1). Then, a gate insulating film GINS 104 is formed on the island SI 116 and then the gate electrode GSL 118 is formed on the film (photo process 2). Next, n-type source and drain regions are doped in the polysilicon island SI 116 using the gate electrode pattern. Then the overall area except the p-channel transistor region is covered by resist and then a dopant is doped in the island SI 116 so as to form the p-type source and drain regions (photo process 3).

Next, a first interlayer insulation film IL1 111 is formed. Contact holes are made in the interlayer insulation film IL1 111 so that the drain signal line DSL 124 and the source electrode ST 126 are connected to the polysilicon island SI 116 through the contact holes (photo process 4). Then the drain signal line DSL 124 and the source electrode ST 126 are formed so that they are connected to the polysilicon island SI 116 through the contact holes (photo process 5).

Then, a second interlayer insulation film IL2 112 is coated with an organic film by means of a coating method and a contact hole is made (photo process 6). Next, a planar common signal line CSL 127 composed of a transparent conductive film is formed on the coated interlayer insulation film IL2 112 (photo process 7). Then, a third interlayer insulation film IL3 113 is formed and a contact hole is made (photo process 8), and the pixel electrode PSL 130 is formed of a transparent conductive film (photo process 9). In some cases, a low-resistance metal may be laminated on the upper portions or the lower portions of the ends of the common signal line and/or the pixel electrode.

The aforementioned conventional manufacture of the liquid crystal pixel comprises nine photolithography processes. Each photolithography process consists of a number of lots of working processes including a resist coating process, an exposing process, a developing process, a baking process, a removal of resist after being worked, and so forth. As shown in FIGS. 17 to 19, between the common signal line CSL 127 and the pixel electrode PSL 130, one auxiliary capacitance CST 146 formed by the overlaid regions through the third interlayer insulation film IL3 113 is located in addition to the capacitance formed by the liquid crystal (that is, the liquid crystal capacitance) LC 144.

As described above, as the LCD device is made more and more high-definitive, the area ratio of the pixel electrode becomes smaller accordingly, so that the auxiliary capacitance does not reach a sufficient level. When the auxiliary capacitance is increased by enlarging the total area of the comb-like pixel electrodes, the transmittance becomes lower and the manufacturing cost becomes high.

It is an object of the present invention to provide an LCD device which is arranged to form a sufficient auxiliary capacitance without lowering the transmittance and increasing the manufacturing cost even if the area ratio of the pixel electrodes becomes smaller owing to the higher definition.

According to an aspect of the invention, another transparent electrode and another insulation film are added to the composition so that two transparent auxiliary capacitances may be formed. Furthermore, the gate electrode is constructed with a two-layered structure of which lower layer is transparent conductive film. An electrode of the auxiliary capacitance is also formed with this lower bottom transparent layer. This transparent conductive film layer is shaped into the electrode of the second transparent auxiliary capacitance by etching process with the mask used for ion-implantation to be executed in doping the source and the drain of the p-channel TFT. This process results in suppressing the increase of the manufacturing steps.

The capacitance structure overlaid on the substrate makes it possible to increase the auxiliary capacitance independently of the lower area ratio of the pixel electrode. This composition makes it possible to solve the short of the auxiliary capacitance induced by lowering the area ratio of the pixel electrode as the display is made more high-definitive, thereby being able to hold the electric potential of the pixel electrode corresponding to the image data. Further, this composition further makes it possible to add the auxiliary capacitance with suppressing the large increase of the burdensome photo processes. As a result, a high-definitive and brighter LCD element with a wide viewing angle can be produced at low cost.

In addition, the present invention may be applied to not only generation of capacitance in a small or medium-sized transparent LCD device arranged to use CMOS low-temperature polysilicon TFTs but also generation of capacitance in another type image display device.

Other objects, features and advantages of the invention will become apparent from the following description of the embodiments of the invention taken in conjunction with the accompanying drawings.

BRIEF DESCRIPTION OF THE DRAWINGS

FIGS. 2A to 2C are schematic cross section views taken on the lines D-D', E-E' and F-F' of FIGS. 1A and 1B, respectively.

FIGS. 5A to 5C are schematic sectional views taken on the lines G-G', H-H' and I-I' of FIG. 4, respectively.

FIGS. 9A to 9C are schematic views taken on the lines J-J', K-K' and L-L' of FIGS. 7A and 7B appearing after a pixel electrode (third transparent electrode PSL2) is formed, respectively.

FIGS. 13A to 13C are schematic cross section views taken on the lines M-M', N-N' and O-O' of FIGS. 11A and 11B appearing when a pixel electrode (third transparent electrode PSL2) is formed, respectively.

FIGS. 18A to 18C are schematic cross section views taken on the lines A-A', B-B' and C-C' of FIGS. 17A and 17B, respectively.

DETAILED DESCRIPTION OF THE EMBODIMENTS

Hereafter, the best embodiments for carrying out the present invention will be described in detail with reference to the appended drawings.

First Embodiment

Figure 1A:
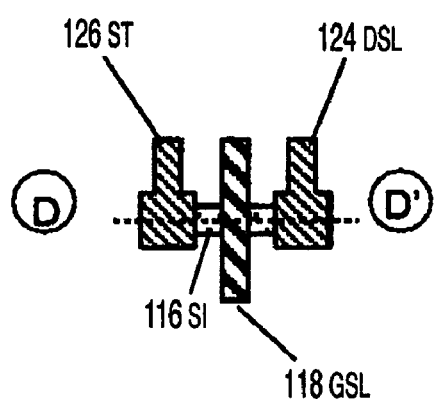
FIGS. 1A and 1B are schematic plan views showing a structure of a p-channel thin-film transistor that concerns a first embodiment of the present invention.
Figure 1B:
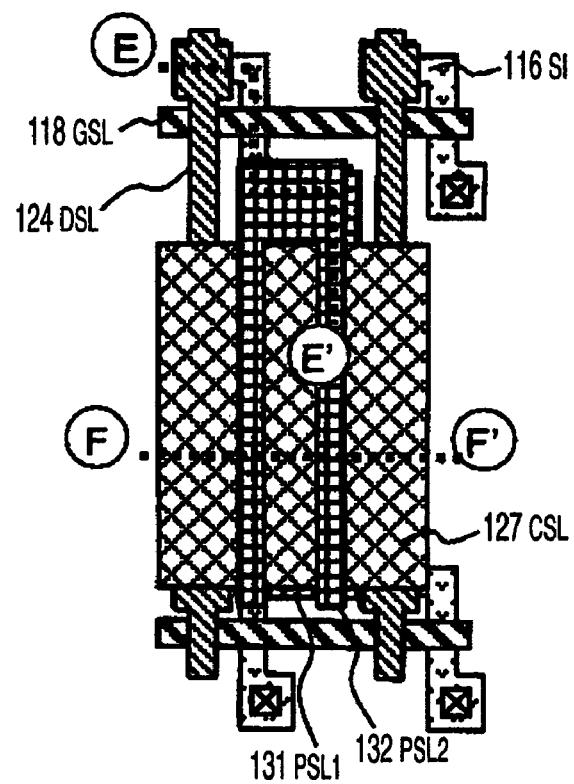
Figure 3:
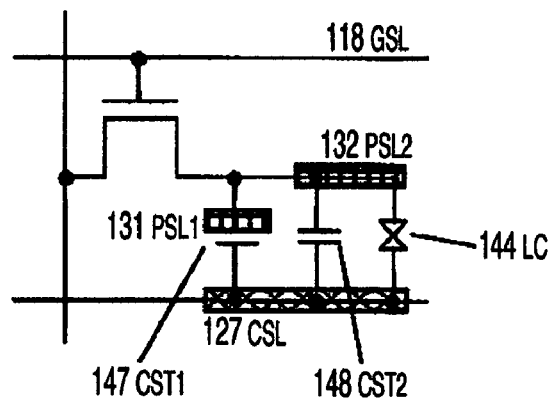
FIG. 3 is a conceptual view showing a circuit arrangement showing a liquid crystal pixel according to the first embodiment of the present invention.

FIGS. 1A and 1B are schematic plan views showing a structure of a p-channel thin-film transistor that concerns the first embodiment of the present invention. FIGS. 2A to 2C are schematic cross section views taken on the lines D-D', E-E' and F-F' of FIGS. 1A and 1B. FIG. 3 is a conceptual view showing a circuit arrangement of a liquid crystal pixel according to the first embodiment of the present invention. Later, the first embodiment will be described along the flow of the manufacturing process. As shown in FIGS. 1A and 1B, the p-channel thin-film transistor is composed of a gate electrode GSL 118, a drain signal line DSL 124 and a source electrode ST 126 formed in a polysilicon island SI 116.

At first, a $SiO_2$ film of 400 nm in thickness is deposited as an underlying film BF 102 on a glass substrate SUB 100 served as a supporting substrate by means of the plasma CVD method. Then, an amorphous silicon film of 50 nm in thickness is deposited on the underlying film BF 102 by means of the plasma CVD method using silane gas. The silicon film is crystallized by the excimer laser annealing technique. The resulting silicon film is made to be the polysilicon island SI 116 by photolithography technique (photo process 1) and dry etching method.

Next, a SiO$_2$ film of 100 nm in thickness is deposited as a gate insulation film GINS 104 on the polysilicon island SI 116 by means of the plasma CVD method using TEOS gas. Then, a tungsten film of 120 nm in thickness is deposited thereon by means of the sputtering method and patterned (photo process 2) to form the gate electrode and the signal line GSL 118. Next, using the gate electrode pattern, doping is executed to form an n-type source and drain regions by means of the phosphorus ion implantation technique.

The overall area except the region corresponding to the p-channel transistor is covered with resist (photo process 3), and then boron ions are implanted for doping in the p-channel source and drain regions. This process is executed to convert the n-type source and drain region into the p-type source and drain region. The SiN film of 300 nm in thickness is deposited as a first interlayer insulation film IL1 111 by means of the plasma CVD method. A contact hole is made in the SiN film (photo process 4).

An aluminum film of 150 nm in thickness laid between upper and lower titanium films of 20 nm in thickness is deposited by means of the sputtering method and patterned (photo process 5) as the drain signal DSL 124, and as a source electrode ST 126 connecting the source and the pixel electrode. The upper and lower barrier films may be formed of an alloy of molybdenum and tungsten.

Then, a resin film of 900 nm in thickness is coated as a second interlayer insulation film IL2 112 by means of the coating method. Contact holes are made in the resin film (photo process 6). Next, an ITO film of 50 nm in thickness is deposited by means of the sputtering method and patterned (photo process 7) to form an electrode PSL1 131 for the second auxiliary capacitance. This transparent electrode PSL1 131 is supplied with the same electric potential as that of the pixel electrode.

An SiN film of 300 nm in thickness is deposited as a third interlayer insulation film IL3 113 by means of the plasma CVD method. Then, an ITO film of 50 nm in thickness is deposited by means of the sputtering method to form the common signal line CSL 127 (photo process 8). Next, an SiN film of 300 nm in thickness is deposited as a fourth interlayer insulation film IL4 114 by means of the plasma CVD method. Then, a contact hole is formed in the SiN film (photo process 9). Then, an ITO film of 50 nm in thickness is deposited as the pixel electrode PSL2 132 by means of the sputtering method (photo process 10).

As shown in FIG. 2B, three transparent electrodes are vertically stacked, and are the third transparent electrode PSL2 132, the second transparent electrode CSL 127 and the first transparent electrode PSL1 131 in descending order. That is, as a top layer, the third transparent electrode served as the pixel electrode is located, as a lower layer, the first transparent electrode with the same electric potential as that of the third electrode is located, and as a middle layer, the second transparent electrode is located as the common signal line.

As shown in FIGS. 2B and 2C, in addition to the capacitance (LC 144) formed by the liquid crystal itself, there are provided a first auxiliary capacitance CST1 147 between the common signal line CSL 127 and the pixel electrode PSL1 131 through the interlayer insulation film IL3 113 laid therebetween and a second auxiliary capacitance CST2 148 between the common signal line CSL 127 and the pixel electrode PSL2 132 through the interlayer insulation film IL4 114 laid therebetween. An imaging circuit according to the first embodiment is shown in FIG. 3.

Figure 15:
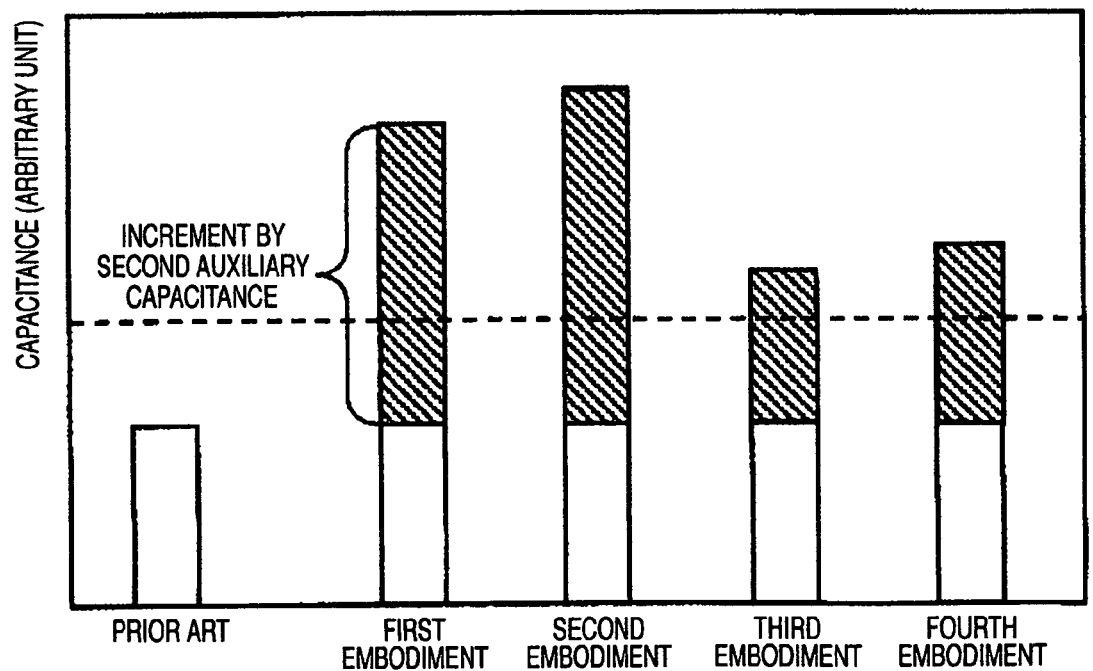
FIG. 15 is a graph showing a comparison between an auxiliary capacitance formed by each embodiment and a capacitance formed by a prior art.
Figure 16:
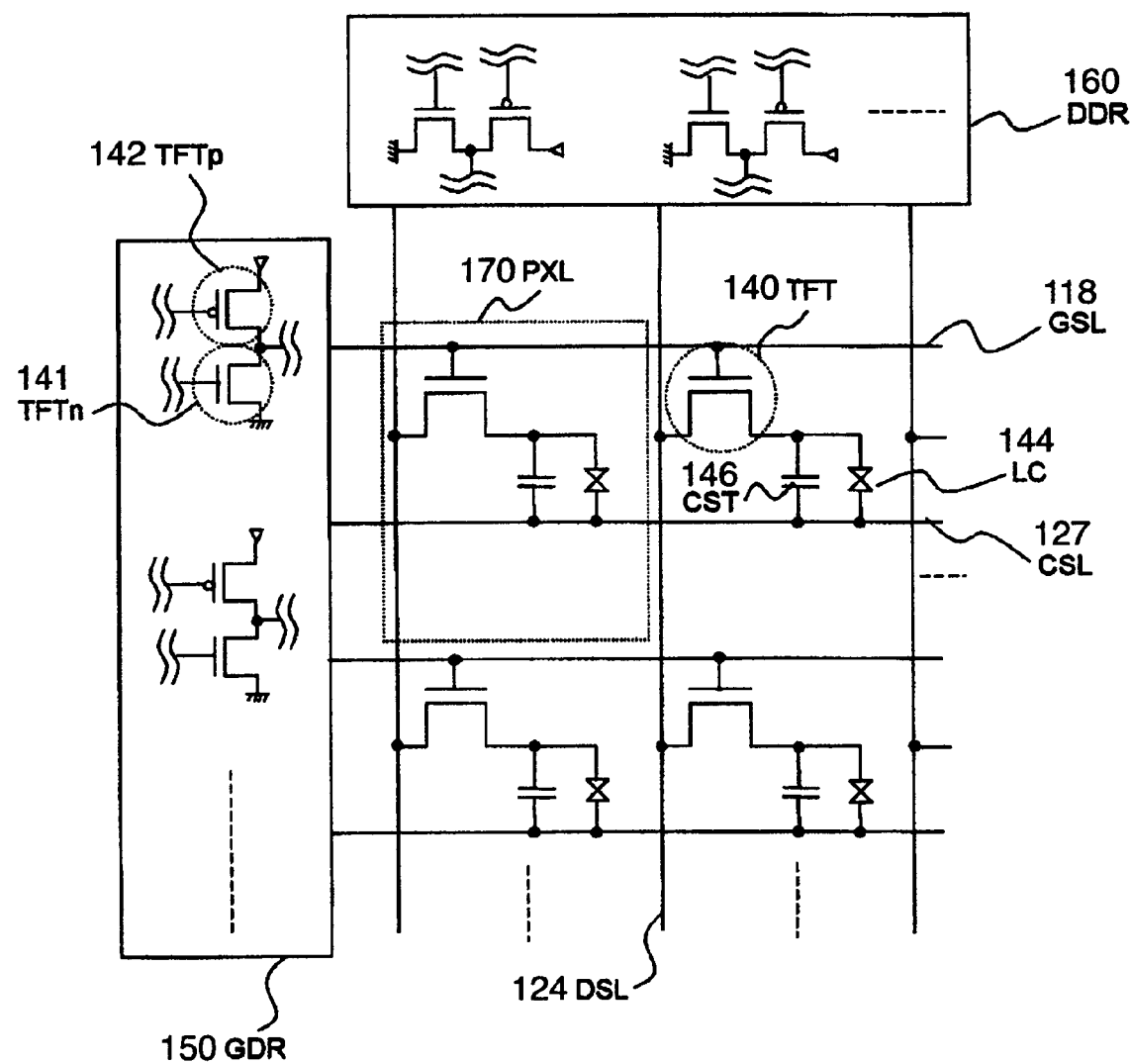
FIG. 16 is an overall conceptual view showing a thin-film transistor array substrate.
Figure 17A:
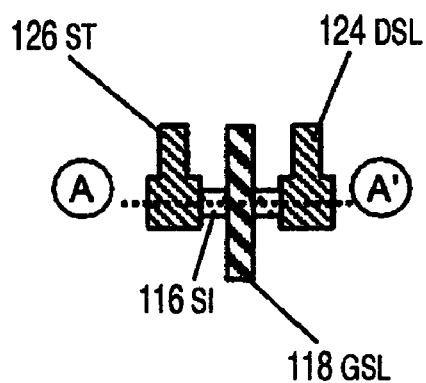
FIGS. 17A and 17B are schematic plan views for explaining a structure of a p-channel thin-film transistor.
Figure 17B:
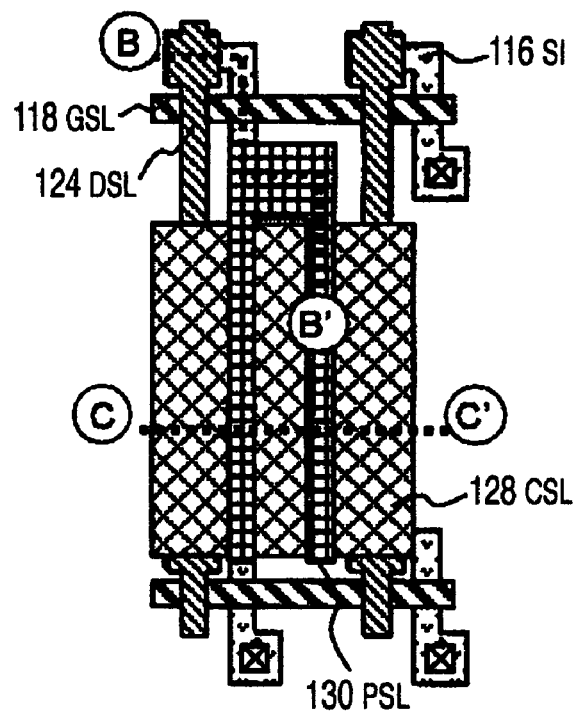
Figure 19:
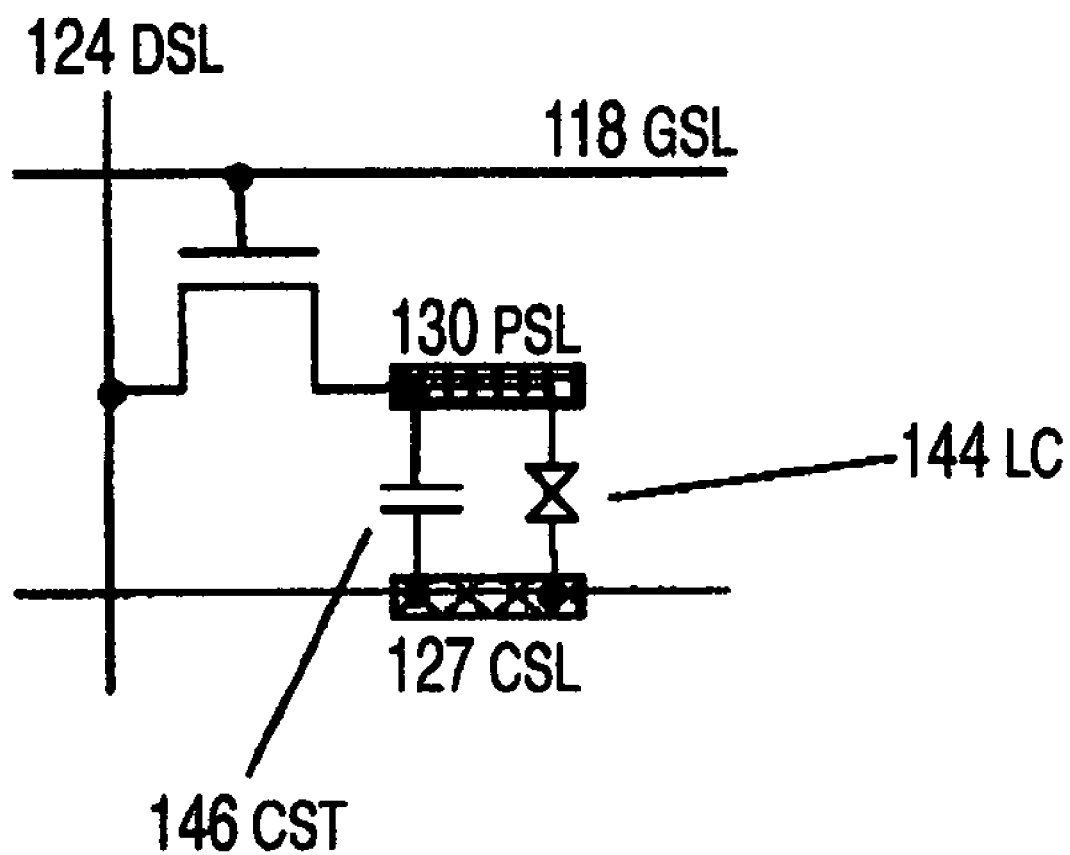
FIG. 19 is a conceptual view showing a circuit arrangement of a liquid crystal pixel.

FIG. 15 shows the comparison between the auxiliary capacitance formed by this embodiment and the capacitance formed by a prior art. The dotted line in FIG. 15 indicates the necessary capacitance value. According to the first embodiment, the auxiliary capacitance can be increased by the second auxiliary capacitance CST2 148 so as to meet the necessary level indicated by the dotted line. As a result, the first embodiment offers a high-definition and brighter LCD element with a wide viewing angle.

Second Embodiment

Figure 4A:
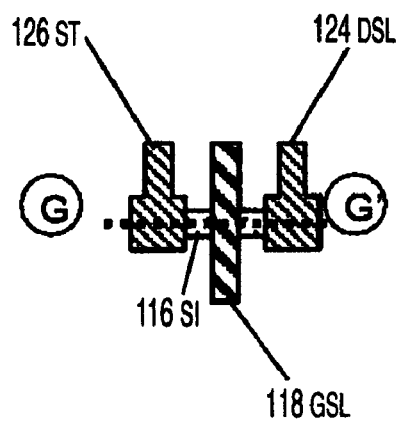
FIGS. 4A and 4B are schematic plan views showing a structure of a p-channel thin-film transistor that concerns a second embodiment of the present invention.
Figure 4B:
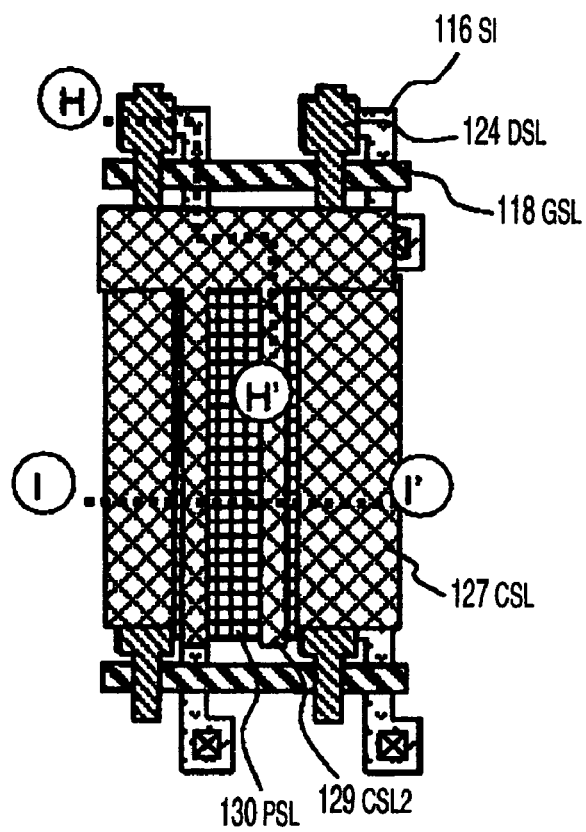
Figure 6:
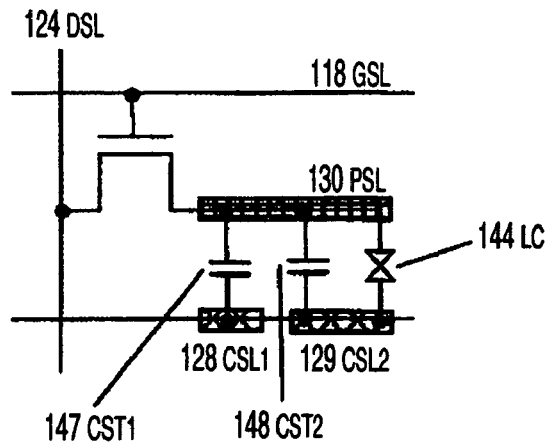
FIG. 6 is a conceptual view showing a circuit arrangement showing a liquid crystal pixel according to the second embodiment of the present invention.

FIGS. 4A and 4B are schematic plan views showing the structure of a p-channel thin-film transistor that concerns the second embodiment of the present invention. FIGS. 5A to 5C are schematic cross section views taken on the lines G-G', H-H' and I-I' of FIGS. 4A and 4B. FIG. 6 is a conceptual view showing a circuit arrangement of a liquid crystal pixel according to the second embodiment of the present invention. Later, the second embodiment will be described along the flow of the manufacturing process.

The different respect of the second embodiment from the first embodiment is that, among the three transparent electrodes stacked vertically with one another, the top layer and the bottom layer are the common signal lines and the middle electrode is the pixel electrode. The process up to the formation of the drain line is the same as that of the first embodiment.

After forming the drain line in the process of the first embodiment, a resin film of 900 nm in thickness is formed on the layer with the drain line formed thereon by means of the coating method. This resin film is formed to be the second interlayer insulation film IL2 112, in which a contact hole is made (photo process 6). Then, an ITO film of 50 nm in thickness is deposited thereon by means of the sputtering method so as to form the common electrode line CSL1 128 (photo process 7). Next, a SiN film of 300 nm in thickness is formed by means of the plasma CVD method so as to form the third interlayer insulation film IL3 113, in which a contact hole is made (photo process 8).

An ITO film of 50 nm in thickness is deposited by means of the sputtering method so as to form a pixel electrode PSL 130 (photo process 9). Then, a SiN film of 300 in thickness is deposited thereon by the plasma CVD method. This SiN film is made to be the fourth interlayer insulation film IL4 114, in which a contact hole is made (photo process 10). Next, an ITO film of 50 nm in thickness is deposited thereon by the sputtering method so as to form a pixel electrode CSL2 129 (photo process 11).

As shown in FIG. 5B and FIG. 6, in addition to the liquid crystal capacitance LC 144, two auxiliary capacitances are formed, that is, one auxiliary capacitance CST2 148 formed between the common signal line CSL2 129 and the pixel electrode PSL 130 overlapped with each other through the insulation film IL4 114 laid therebetween and the other auxiliary capacitance CST1 147 formed between the pixel electrode PSL 130 and the common signal line CSL1 128 overlapped with each other through the insulation film IL3 113 laid therebetween.

FIG. 15 shows the comparison between the auxiliary capacitance formed by the second embodiment and the capacitance formed by the prior art. The increase of the auxiliary capacitance formed by the second embodiment makes it possible to meet the necessary level indicated by the dotted line. Hence, the second embodiment offers a high-definition and brighter LCD element with a wide viewing angle.

The number of photo processes included in the first or the second embodiment is eleven, which is greater than that of the prior art. To overcome this shortcoming, the structure that offers the same effect to suppress the increase of photo processes will be described later.

Third Embodiment

Figure 7A:
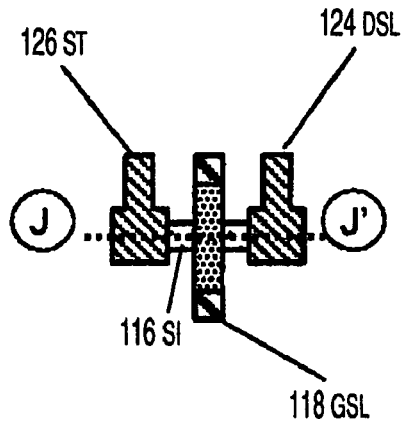
FIGS. 7A and 7B are schematic plan views showing a structure of a p-channel thin-film transistor that concerns with a third embodiment of the present invention.
Figure 7B:
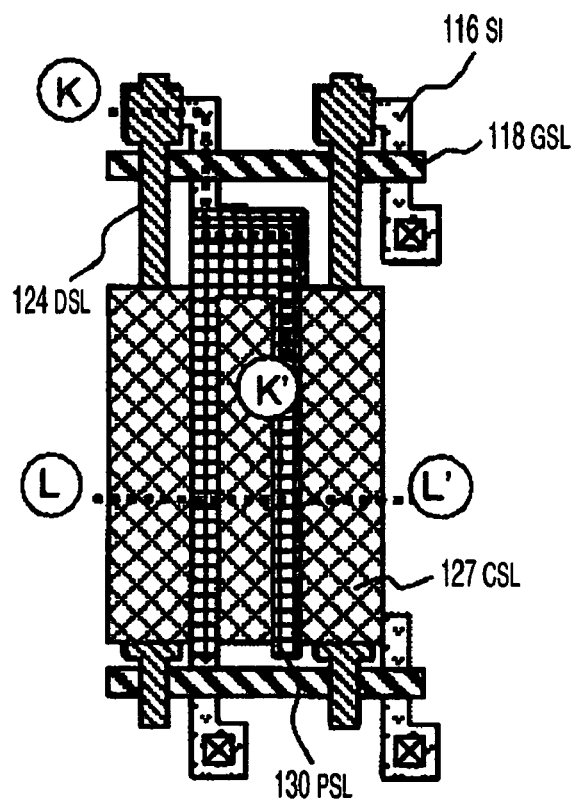
Figure 8A:
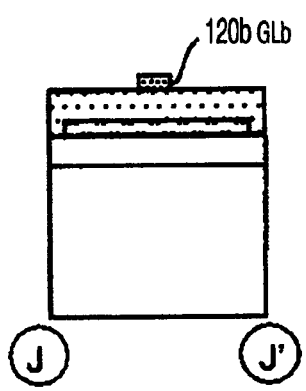
FIGS. 8A and 8B are schematic cross section views taken on the lines J-J' and K-K' of FIGS. 7A and 7B, appearing when a gate electrode is formed, respectively.
Figure 8B:
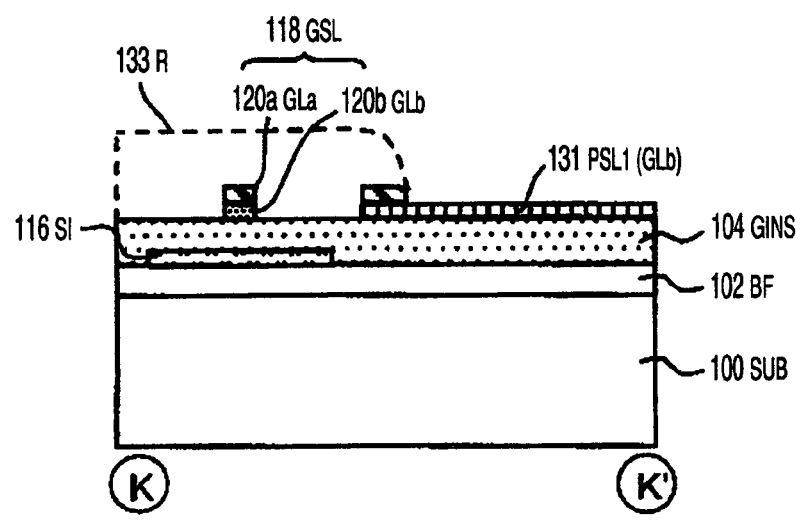
Figure 10:
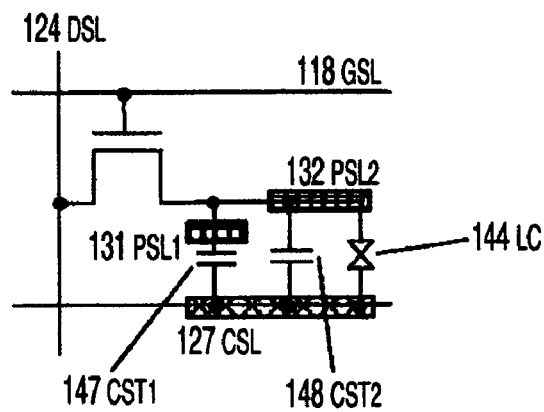
FIG. 10 is a conceptual view showing a circuit arrangement of a liquid crystal pixel according to the third embodiment of the present invention.

FIGS. 7A and 7B are schematic plan views showing the structure of a p-channel thin-film transistor that concerns the third embodiment of the present invention. FIGS. 8A and 8B are schematic cross section views taken on the lines J-J' and k-K' of FIGS. 7A and 7B appearing when the gate electrode is formed. FIGS. 9A to 9C are schematic cross section views taken on the lines J-J', K-K' and L-L' of FIGS. 7A and 7B appearing after the pixel electrode (third transparent electrode PSL2 132) is formed. FIG. 10 is a conceptual view showing a circuit arrangement of a liquid crystal pixel that concerns the third embodiment of the present invention. Later, the third embodiment will be described along the flow of the manufacturing process.

A $SiO_2$ film of 400 nm in thickness is deposited on a glass substrate served as a supporting substrate SUB 100 by means of the plasma CVD method. The deposited $SiO_2$ film is formed to be an underlying film BF 102. Then, an amorphous silicon film of 50 nm in thickness is deposited on the underlying film BF 102 by means of the plasma CVD method using silane gas as the raw material. The deposited film is crystallized by means of the excimer laser annealing technique so as to form a polysilicon film and patterned to be polysilicon islands SI 116 (photo process 1).

Next, a $SiO_2$ film of 100 nm in thickness is deposited on the island SI 116 by means of the plasma CVD method using TEOS gas as the raw material so as to form a gate insulation film GINS 104. If the ion implantation is required for adjusting a threshold value of an n-channel transistor, the ion implantation is carried out at this stage. Then, a gate electrode of an ITO film of 50 nm in thickness as a bottom layer and a molybdenum and tungsten alloy of 100 nm in thickness as a bottom layer are laminated by means of the sputtering method and worked into the gate electrodes GSL 118 (photo process 2). To form an n-type source and drain regions, phosphorus ions are doped using the gate electrode as the mask.

The overall area except the region corresponding to the p-channel transistor is covered with resist and boron ions are doped into p-channel source and drain regions. In this process, as shown in FIGS. 8A and 8B, the resist pattern of the region corresponding with the second auxiliary capacitance electrode PSL1 131 is made open and only the upper metal GLa 120a is removed. This removal makes the auxiliary capacitance electrode PSL1 131 transparent. At the same time, only the lower transparent conductive film GLb 120b is left as the gate electrode of the p-channel transistor 142. If the ion implantation is required for adjusting a threshold value of the p-channel transistor 142, the ion implantation is carried out at this stage (photo process 3).

Then, a SiN film of 300 nm in thickness is deposited as a first interlayer insulation film IL1 111 by means of the plasma CVD method and patterned to make contact holes (photo process 4). Next, an aluminum and silicon alloy of 150 nm in thickness is deposited on the insulation film IL1 111 by the sputtering method and patterned to form a drain electrode DSL 124 (photo process 5). This alloy film is sandwiched by titanium films of 20 nm in thickness. Then, to form the second interlayer insulation film IL2 112, an SiN film of 300 nm in thickness is deposited as the second interlayer insulation film IL2 112 by means of the plasma CVD method. A transparent conductive film, an ITO film of 50 nm in thickness is deposited and patterned to be the common signal line CSL 127 (photo process 6).

Next, a SiN film of 300 nm in thickness is deposited as a third interlayer insulation film IL3 113 by means of the plasma CVD method and a contact hole is made in the film IL3 113 (photo process 7). Then, to form a pixel electrode of a transparent conductive film, an ITO film of 50 nm in thickness is deposited as the pixel electrode PSL 130 by means of the sputtering method (photo process 8).

As shown in FIGS. 9A-9C and 10, in addition to the capacitance LC 144 formed by the liquid crystal, two auxiliary capacitances are formed, that is, a first auxiliary capacitance CST1 147 formed between the common signal line CSL 127 and the pixel electrode PSL1 131 overlapped with each other through the insulation films IL1 111 and IL2 112 laid therebetween and a second auxiliary capacitance CST2 148 formed between the common signal line CSL 127 and the pixel electrode PSL2 132 overlapped with each other through the insulation film IL3 113 laid therebetween.

FIG. 15 shows the comparison between the auxiliary capacitance formed by the third embodiment and the capacitance formed by the prior art. Since the insulation film is composed of the interlayer insulation films 1 and 2 in the third embodiment, the insulation film is relatively thick. Hence, though the capacitance of the third embodiment is smaller that of the first or the second embodiment, the capacitance sufficiently meets the necessary level indicated by the dotted line of FIG. 15.

In the third embodiment, the number of photo processes is 8, which means that the third embodiment makes it possible to add the second auxiliary capacitance though it needs a smaller number of photo processes than that of the prior art. Therefore, the third embodiment offers a high-definition and bright LCD element with a wide viewing angle at low cost.

Fourth Embodiment

Figure 11A:
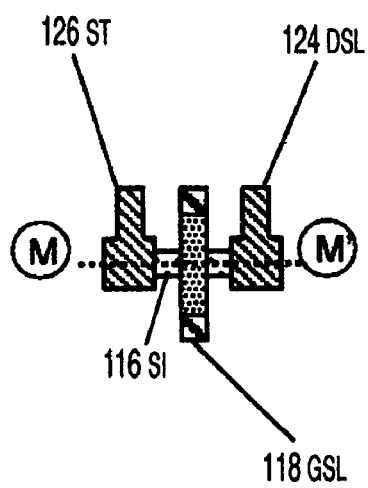
FIGS. 11A and 11B are schematic plan views showing a structure of a p-channel thin-film transistor that concerns with a fourth embodiment of the present invention.
Figure 11B:
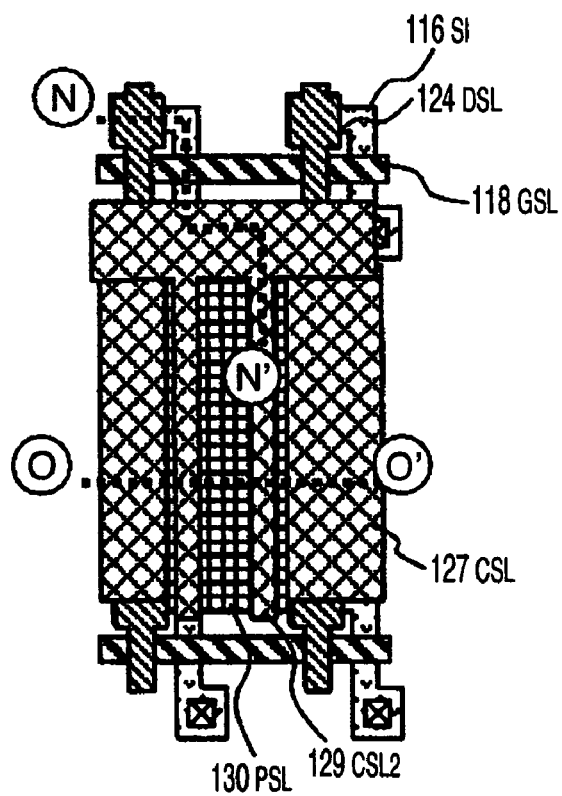
Figure 12A:
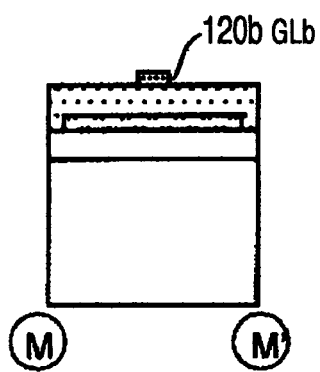
FIGS. 12A and 12B are schematic cross section views taken on the lines M-M' and N-N' of FIGS. 11A and 11B appearing when a gate electrode is formed, respectively.
Figure 12B:
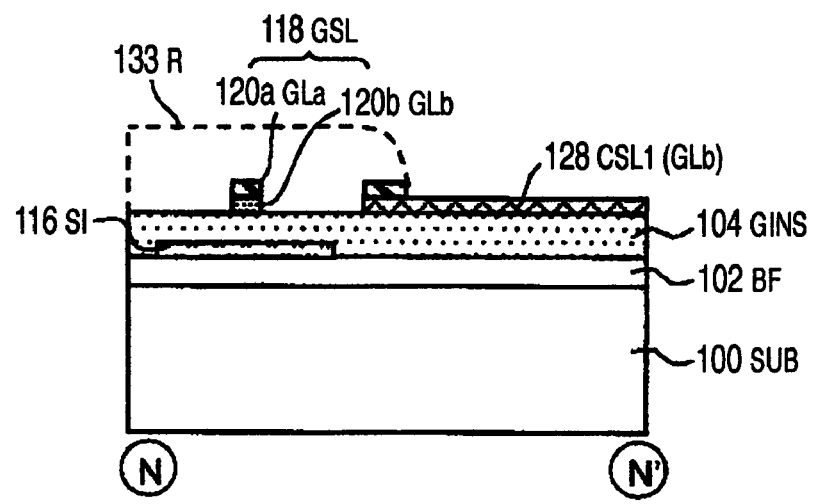
Figure 14:
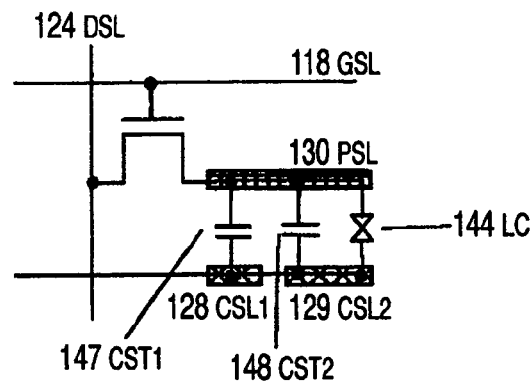
FIG. 14 is a conceptual view showing a circuit arrangement showing a liquid crystal pixel according to the fourth embodiment of the present invention.

FIGS. 11A and 11B are schematic plan views showing the structure of a p-channel thin-film transistor that concerns the fourth embodiment of the present invention. FIGS. 12A and 12B are schematic cross section views taken on the lines M-M' and N-N' of FIGS. 11A and 11B appearing when a gate electrode is formed. FIGS. 13A to 13C are schematic sectional views taken on the lines M-M', N-N' and O-O' of FIGS. 11A and 11B appearing when a pixel electrode (third transparent electrode PSL2 132) is formed. FIG. 14 is a conceptual view showing a circuit arrangement of a liquid crystal pixel according to the fourth embodiment of the present invention. Later, the fourth embodiment will be described along the flow of the manufacturing process.

The different respect of the fourth embodiment from the third embodiment is that, among the three transparent electrodes stacked vertically, the top and the bottom transparent electrodes are common electrode lines and the middle transparent electrode is a pixel electrode. Since a contact hole is formed in the interlayer insulation film IL3, the number of the photo processes is increased by one as compared to that of the third embodiment, that is, the fourth embodiment has nine photo processes.

As shown in FIGS. 13A to 13C and 14, in addition to the capacitance LC 144 formed by the liquid crystal, two auxiliary capacitances are formed, that is, a first auxiliary capacitance CST1 147 formed between the pixel electrode PSL 130 and the common signal line CSL1 128 overlapped with each other through the insulation films IL1 111 and IL2 112 laid therebetween and a second auxiliary capacitance CST2 148 formed between the common signal line CSL2 129 and the pixel electrode PSL 130 overlapped with each other through the insulation film IL3 113 laid therebetween.

FIG. 15 shows the comparison between the auxiliary capacitance formed by the fourth embodiment and the capacitance formed by the prior art. Like the third embodiment, since the fourth embodiment uses a thicker insulation film composed of the first and the second interlayer insulation films, the capacitance value formed by the fourth embodiment is smaller than that formed by the first or the second embodiment. Even the smaller capacitance sufficiently meets the necessary level indicated in dotted line.

In the fourth embodiment, the number of photo processes is nine, which means that the fourth embodiment makes it possible to add the second auxiliary capacitance though it needs the same number of photo processes as the prior art. Therefore, the fourth embodiment offers a high-definition and bright LCD element with a wide viewing angle at low cost.

Hereafter, the description will be oriented to the method of manufacturing the LCD device arranged to use the TFT substrate described in any of the first to the fourth embodiments. In the manufacture, a liquid crystal orientation film layer is formed on the TFT substrate having the structure according to any of the foregoing embodiments and orientation regulation is applied to the film layer by means of the rubbing method or the like. Then, after a sealing agent is formed around the pixel, the other substrate with the orientation film layer formed in the similar manner is opposed to that substrate with a predetermined gap therebetween. Next, the liquid crystal is sealed in the gap and a sealing inlet formed with the sealing agent is closed by a sealing material. The device in this state is called a liquid crystal cell.

A polarizing plate is laminated on each side of the liquid crystal cell structured as described above. Then, a waveguide plate and a backlight unit such as an LED lamp are mounted on the polarizing plate through an optical compensating member such as a diffusing sheet or a prism sheet. Next, the overall structure is enclosed by a mold case or a shield case. The resulting structure is made to be the LCD device. A driving circuit is mounted around the liquid crystal cell so that the driving circuit is supplied with data and timing signals via a flexible printed board.

In the foregoing embodiments, the supporting substrate may be not only a glass substrate but also a resin substrate or another insulating substrate. If the resin substrate is used, the shock resistance of the LCD device is enhanced. Further, not only one but also more thin-film transistors may be installed in one pixel. If two or more thin-film transistors are installed in a pixel, a fraction failure due to a leak current is reduced.

When a dopant is implanted into the n-type source and drain regions, it is possible to form an LDD (Lightly Doped Drain) region. The LDD structure makes it possible to reduce the leaked current.

For the interlayer insulation film, it is possible to use not only the SiN film but also a $SiO_2$ film, a SiON film or a lamination film of the $SiO_2$ film and the SiN film. Further, another inorganic film, another organic film, or a lamination layer of an inorganic film and an organic film may be used. Moreover, for the transparent electrode, it is possible to use not only the ITO film but also a ZnO film, an IZO film, an IZTO film, or another transparent conductive film. A low-resistance metal may be laminated on the top or the bottom of the end of the common signal line. The lamination of the low-resistive metal layers makes it possible to reduce a voltage drop of pixels distant from a potential source. What is required for the common signal line is a planar form in the pixel portion. It may have a cut-away portion. The comb-like form may be arranged so that the tips may be connected in a slit manner. This form thus makes it possible to reduce a voltage drop of pixels distant from the electric potential source.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device having a substrate on which a thin-film transistor array is formed, comprising:

said thin-film transistor array being composed of thin-film transistors, each gate electrode of which has a lamination structure composed of metal layers, each gate electrode being located above a polysilicon island in relation to said substrate; and said substrate having three transparent electrode layers of a first transparent electrode, a second transparent electrode and a third transparent electrode laminated in parallel to a surface of said substrate; and wherein an auxiliary capacitance to a liquid crystal capacitance is formed between said first and said second transparent electrodes and between said second and said third transparent electrodes and one of said transparent electrodes is on the same layer as one layer of each laminated gate electrode.

2. The liquid crystal display device as claimed in claim 1, wherein said third transparent electrode is the top layer of said three transparent electrode layers and is split on a plane in parallel to the surface of the substrate in a manner that said third transparent electrode takes a comb-like or a slit form.

3. The liquid crystal display device as claimed in claim 1, wherein said third transparent electrode is the top layer of said three transparent electrode layers, said first transparent electrode is the bottom layer thereof, and said third transparent electrode is electrically connected to said first transparent electrode.

4. The liquid crystal display device as claimed in claim 1, wherein said third transparent electrode composes a pixel electrode on the top of said three transparent electrode layers, said first transparent electrode composes a bottom layer thereof, and said second transparent electrode located as a middle layer between said third and said first transparent electrode composes a common electrode.

5. The liquid crystal display device as claimed in claim 1, wherein the first, second, and third transparent electrodes of the three transparent electrodes are overlapped.

* * * * *